United States Patent Office 2,816,063
Patented Dec. 10, 1957

2,816,063

PURIFICATION OF CYCLOHEXANONE OXIME

John D. Christian, Texas City, Tex., assignor to Monsanto Chemical Company, St. Louis, Mo., a corporation of Delaware No Drawing. Application September 28, 1953, Serial No. 382,833

2 Claims. (Cl. 202—39.5)

The present invention relates to an improved process for the separation of nitrocyclohexane from cyclohexanone oxime. More particularly, it pertains to a method for separating mixtures of these two compounds by subjecting them to extractive distillation with water.

Cyclohexanone oxime is a valuable chemical intermediate particularly for the manufacture of superpolyamides which are currently in commercial demand in the plastics field. The oxime can be obtained in good yield by reduction of nitrocyclohexane using any of a number of various reducing agents in the presence of suitable catalysts. A typical process for such a reduction is described, for example, in U. S. 2,638,482. In all of the known processes, however, conversion of the nitrocyclohexane is such that the reaction product usually contains varying amounts of the nitrocyclohexane from which it is derived and must be separated therefrom if the oxime product is to be suitable for further use. Such separation is also dictated by economic considerations since it makes possible recycle of the nitrocyclohexane with a consequent dollar savings in raw material costs and increased process efficiency.

Separation of the two compounds, nitrocyclohexane and cyclohexanone oxime, by ordinary fractional distillation techniques is very difficult since the two compounds boil, at atmospheric pressure, at 206° C. and 204° C. respectively. Ordinary extraction methods are both time consuming and expensive requiring elaborate equipment and a number of process steps to produce a product of the desired purity. Separation by crystallization techniques is likewise impractical because of the appreciable solubility of the oxime in nitrocyclohexane.

It is an object of the invention, therefore, to provide an improved process which is both simple and efficient for separating nitrocyclohexane from cyclohexanone oxime in mixtures thereof.

It is a further object of this invention to provide a simple, efficient, and improved process for separating nitrocyclohexane from cyclohexanone oxime in mixtures thereof by an extractive distillation technique.

Further objects will become apparent from the following description of the novel process of the invention.

It has now been discovered that, because of the relative differences in the solubility of nitrocyclohexane and cyclohexanone oxime in water, the relative volatilities of the two compounds may be sufficiently altered by distillation in the presence of water to effect their separation in this manner. Nitrocyclohexane is insoluble in water while cyclohexanone oxime is moderately soluble. In a system containing these compounds, therefore, the volatility of the oxime may be reduced during distillation by continuously injecting a stream of water into the upper section of the fractionating column and allowing it to flow countercurrent to the vapors rising from the still. Thus the cyclohexanone oxime is constantly extracted down the column while the nitrocyclohexane is allowed to distill overhead. Cyclohexanone oxime may be readily recovered from the still material since it crystallizes readily upon cooling. The nitrocyclohexane overhead product is readily separated from any water which is carried overhead with it by settling and decantation.

According to the invention, a mixture of nitrocyclohexane and cyclohexanone oxime is subjected to continuous distillation in a conventional fractionating column in which a constant stream of water, supplied at an upper point in the column, flows countercurrent to the ascending vapors thereby extracting cyclohexanone oxime therefrom while the nitrocyclohexane is taken overhead. Water carried overhead is separated from the nitrocyclohexane fraction by settling and decantation and is returned as reflux to the column for re-use. A stream of cyclohexanone oxime-water is continuously withdrawn from the bottom of the column from which the oxime may be recovered by standard well-known methods.

The following example will ilustrate the invention but is not to be construed as limiting it in any manner.

Example I

The fractionating column employed was a 22-in. x ¾-in. glass tube packed with 3-mm. glass beads and wrapped with heating tape. A special head equipped with a phase-separation chamber was attached to the column so that the aqueous phase of the distillate could be returned as reflux to the column. The still, a 300-ml round-bottomed flask, was heated by means of a conventional heating mantle. A solution of nitrocyclohexane (51.2 g.) containing 22.9% by weight of cyclohexanone oxime (11.7 g.) was charged to the still along with 100 ml. of water and brought to boiling temperature. The column was operated on total take-off and the nitrocyclohexane-water vapors were taken overhead into the special receiver where they were condensed and separated into two layers with the water phase being continuously returned to the column as reflux.

The overhead organic layer of nitrocyclohexane recovered contained only 2.7% by weight cyclohexanone oxime. This nitrocyclohexane material was eminently suitable for recycling to the reduction step for conversion to more cyclohexanone oxime. The pot material on cooling yielded a crystalline cyclohexanone oxime product having a melting point of 87–89° C. The oxime in the remaining liquor was readily extracted therefrom with benzene to give a total product recovery approximating 90%.

While the example given represents a batch operation, the process of the invention is not restricted thereto. In fact, optimum efficiency may be more nearly achieved by employing essentially continuous operation.

Any fractionating column of conventional design providing for countercurrent liquid-vapor contact under reboiling and refluxing conditions may be employed in the process of the invention but a packed column is to be preferred. The number of theoretical plates required depends upon the efficiency of separation desired, the quantity of water employed, the reflux ratio, and other related factors; in general, however, from 5 to 25 theoretical plates are adequate.

In continuous operations, the feed is preferentially introduced into the middle section of the fractionating column while the water is added near the top of the column at the rate required to maintain essentially steady state conditions. It is advantageous to control the temperature of the water introduced so that it closely approximates the temperature of the liquid on the feed plate where it enters the column. However, this is not necessary and, if desired, the water feed temperature may be regulated at a lower temperature to partially condense more of the ascending vapors.

The quantity of water required to be introduced continuously at the top of the column for accomplishing the desired separation may vary over rather wide limits, depending upon the efficiency of separation desired and the composition of the feed mixture. In order to effect the separation with a reasonable number of plates, a water concentration of at least one volume of water per volume of feed is desirable. Selectivity of separation may be enhanced by employing quantities of water in excess of the minimum, since there is a direct relationship between volatility of the cyclohexanone oxime and the quantity of water employed as extracting agent. Separation becomes sharper as larger and larger quantities of water are used, but operating efficiency is lowered considerably because of the relatively small quantities of feed material being processed. Too large an excess of water is, therefore, to be avoided. For optimum results on a practical scale, for example, with a mixture containing 25% cyclohexanone oxime and 75% nitrocyclohexane, a satisfactory water concentration is maintained and excellent separation is effected if 1.5–2 volumes of water are employed per volume of feed.

Although generally the extractive distillation is to be carried out at about atmospheric pressure, it may be conducted at, below, or above atmospheric pressure.

What is claimed is:

1. A continuous process for separating nitrocyclohexane from a mixture thereof with cyclohexanone oxime which comprises continuously introducing said mixture to a fractional distillation zone at an intermediate point thereof, applying heat to the fractional distillation zone whereby vapors of nitrocyclohexane, water, and cyclohexanone oxime ascend through the fractional distillation zone, supplying a constant stream of water to said fractional distillation zone at a point substantially above the feed point of the mixture so that there is present in said distillation zone at least one volume of water per volume of the distillation charge, continuously withdrawing overhead from the fractional distillation zone a vaporous mixture comprising nitrocyclohexane and water, and continuously recovering from the bottom portion of the fractional distillation zone a water solution of substantially pure cyclohexanone oxime.

2. A continuous process for separating nitrocyclohexane from a mixture thereof with cyclohexanone oxime which comprises continuously introducing said mixture to a fractional distillation zone at an intermediate point thereof, applying heat to the fractional distillation zone whereby vapors of nitrocyclohexane, water, and cyclohexanone oxime ascend through the fractional distillation zone, supplying a constant stream of water to said fractional distillation zone at a point substantially above the feed point of the mixture so that there is present in said distillation zone at least one volume of water per volume of the distillation charge, continuously withdrawing overhead from the fractional distillation zone a vaporous mixture comprising nitrocyclohexane and water, continuously condensing said vapors, separating them into two phases, returning the water phase to the column for re-use as an extractant, and continuously recovering an aqueous solution of cyclohexanone oxime from the bottom portion of the fractional distillation zone.

References Cited in the file of this patent
UNITED STATES PATENTS

| | | |
|---|---|---|
| 1,929,901 | Ricard et al. | Oct. 10, 1933 |
| 2,595,805 | Morrell et al. | May 6, 1952 |
| 2,638,482 | Grundmann | May 12, 1953 |
| 2,662,847 | Eliot et al. | Dec. 15, 1953 |

OTHER REFERENCES

Technique of Organic Chemistry, vol. IV, Distillation, Weissberger, Chapter III, pages 317 to 385, pages 317, 318, 319, 374, 375, 382, 383, relied upon.

Ser. No. 390,038, Lacht (A. P. C.), published Apr. 20, 1943.